(12) United States Patent
Stewart

(10) Patent No.: US 9,563,922 B2
(45) Date of Patent: Feb. 7, 2017

(54) SOCIAL NETWORKING SYSTEM WHICH PROVIDES LOCATION INFORMATION OF RELATED

(75) Inventor: Brett B. Stewart, Austin, TX (US)

(73) Assignee: CHEMTRON RESEARCH LLC, Dover, DE (US)

(*) Notice: Subject to any disclaimer, the term of this patent is extended or adjusted under 35 U.S.C. 154(b) by 174 days.

(21) Appl. No.: 13/029,060

(22) Filed: Feb. 16, 2011

(65) Prior Publication Data

US 2011/0137997 A1 Jun. 9, 2011

Related U.S. Application Data

(63) Continuation of application No. 12/886,128, filed on Sep. 20, 2010, which is a continuation of application No. 11/641,497, filed on Dec. 19, 2006, now Pat. No. 7,801,542.

(60) Provisional application No. 60/752,165, filed on Dec. 19, 2005.

(51) Int. Cl.
*G06Q 50/00* (2012.01)
*H04W 4/18* (2009.01)
*H04W 4/02* (2009.01)
*H04L 29/08* (2006.01)
*H04L 12/58* (2006.01)

(52) U.S. Cl.
CPC ............ *G06Q 50/01* (2013.01); *H04L 67/18* (2013.01); *H04W 4/02* (2013.01); *H04W 4/18* (2013.01); *H04L 51/20* (2013.01); *H04L 67/24* (2013.01); *H04W 4/021* (2013.01); *H04W 4/027* (2013.01)

(58) Field of Classification Search
CPC ...... H04W 4/027; H04W 4/021; H04W 48/04; H04W 4/02; H04W 40/205; H04L 51/20; H04L 29/08684; H04L 67/24; H04L 63/107; H04L 9/0872
USPC .................................................. 709/204, 205
See application file for complete search history.

(56) References Cited

U.S. PATENT DOCUMENTS

| | | |
|---|---|---|
| 5,485,163 A | 1/1996 | Singer |
| 5,835,061 A | 11/1998 | Stewart |
| 5,969,678 A | 10/1999 | Stewart |
| 6,014,090 A | 1/2000 | Rosen |
| 6,032,051 A | 2/2000 | Hall |
| 6,167,277 A | 12/2000 | Kawamoto |
| 6,236,365 B1 | 5/2001 | LeBlanc |
| 6,414,635 B1 | 7/2002 | Stewart et al. |

(Continued)

FOREIGN PATENT DOCUMENTS

| | | |
|---|---|---|
| WO | WO9800988 | 1/1998 |

OTHER PUBLICATIONS

"It's All About Location, A Location Technology Tutorial," White Paper; Telecommunications Systems; www.telecomsys.com; © 2003 TeleCommunication Systems, Inc.; 2003, pp. i-9.

(Continued)

*Primary Examiner* — Tom Y Chang
(74) *Attorney, Agent, or Firm* — Schwabe, Williamson & Wyatt

(57) ABSTRACT

Systems, methods, apparatus and software have been discovered for use by individual users to monitor the geographic location of other people or assets with some relationship to the user. Once some manner of location information is determined, users have the ability to describe that location in various ways and control how that information is shared with other users.

17 Claims, 4 Drawing Sheets

(56) References Cited

U.S. PATENT DOCUMENTS

| | | |
|---|---|---|
| 6,449,344 B1 | 9/2002 | Goldfinger et al. |
| 6,456,854 B1 | 9/2002 | Chern |
| 6,504,503 B1 | 1/2003 | Saint-Hilaire |
| 6,529,136 B2 | 3/2003 | Cao |
| 6,549,768 B1 | 4/2003 | Fraccaroli |
| 6,553,236 B1 | 4/2003 | Dunko |
| 6,556,831 B1 | 4/2003 | Buppelmann |
| 6,618,593 B1 | 9/2003 | Drutman et al. |
| 6,681,108 B1 | 1/2004 | Terry |
| 6,714,791 B2 | 3/2004 | Friedman |
| 6,716,101 B1 | 4/2004 | Meadows |
| 6,718,176 B2 | 4/2004 | Michaud |
| 6,732,176 B1 | 5/2004 | Stewart |
| 6,857,016 B1 | 2/2005 | Motoyama |
| 6,867,733 B2 | 3/2005 | Sandhu |
| 6,868,333 B2 | 3/2005 | Melen |
| 6,885,874 B2 | 4/2005 | Grube |
| 6,920,328 B2 | 7/2005 | Wollrab |
| 6,944,443 B2 | 9/2005 | Bates |
| 6,968,179 B1 | 11/2005 | De Vries |
| 7,065,348 B1 | 6/2006 | Aoki |
| 7,080,139 B1 | 7/2006 | Briggs et al. |
| 7,084,809 B2 | 8/2006 | Hockley, Jr. |
| 7,181,227 B2 | 2/2007 | Wilson |
| 7,181,230 B2 | 2/2007 | Nonoyama |
| 7,219,303 B2 | 5/2007 | Fish |
| 7,224,987 B1 | 5/2007 | Bhela |
| 7,263,076 B1 | 8/2007 | Leibovitz |
| 7,271,742 B2 | 9/2007 | Sheha |
| 7,292,935 B2 | 11/2007 | Yoon |
| 7,310,534 B2 | 12/2007 | Northcutt |
| 7,333,820 B2 | 2/2008 | Sheha |
| 7,353,034 B2 | 4/2008 | Haney |
| 7,366,509 B2 | 4/2008 | Akgun |
| 7,366,522 B2 | 4/2008 | Thomas |
| 7,443,283 B2 | 10/2008 | Schmandt |
| 7,593,740 B2 | 9/2009 | Crowley et al. |
| 7,599,950 B2 | 10/2009 | Walther |
| 7,606,580 B2 * | 10/2009 | Granito et al. ............ 455/456.1 |
| RE41,450 E | 7/2010 | Briggs et al. |
| 7,801,542 B1 | 9/2010 | Stewart |
| 7,899,469 B2 | 3/2011 | Casey |
| 7,917,153 B2 | 3/2011 | Orwant et al. |
| 8,385,964 B2 | 2/2013 | Haney |
| 8,391,909 B2 | 3/2013 | Stewart |
| 2002/0035609 A1 | 3/2002 | Lessard |
| 2002/0111201 A1 | 8/2002 | Lang |
| 2002/0173981 A1 | 11/2002 | Stewart |
| 2003/0060212 A1 | 3/2003 | Thomas |
| 2003/0126250 A1 | 7/2003 | Jhanji |
| 2004/0015564 A1 | 1/2004 | Williams |
| 2005/0130680 A1 | 6/2005 | Northcutt |
| 2005/0153724 A1 | 7/2005 | Vij |
| 2005/0170851 A1 | 8/2005 | Melpignano |
| 2005/0227705 A1 | 10/2005 | Rousu |
| 2005/0227711 A1 | 10/2005 | Orwant |
| 2005/0231425 A1 | 10/2005 | Coleman |
| 2006/0022048 A1 | 2/2006 | Johnson |
| 2006/0063560 A1 | 3/2006 | Herle |
| 2006/0105795 A1 | 5/2006 | Cermak |
| 2006/0155461 A1 | 7/2006 | Cho |
| 2006/0161634 A1 | 7/2006 | Tseng |
| 2006/0174329 A1 | 8/2006 | Dublish |
| 2006/0223518 A1 | 10/2006 | Haney |
| 2006/0270419 A1 * | 11/2006 | Crowley et al. ............ 455/456.2 |
| 2007/0032244 A1 | 2/2007 | Counts |
| 2007/0082677 A1 | 4/2007 | Hart |
| 2007/0118509 A1 | 5/2007 | Svendsen |
| 2007/0156664 A1 | 7/2007 | Norton |
| 2008/0102856 A1 * | 5/2008 | Fortescue et al. ......... 455/456.1 |
| 2008/0104227 A1 | 5/2008 | Birnie et al. |
| 2009/0197612 A1 | 8/2009 | Kiiskinen |
| 2010/0241346 A1 * | 9/2010 | Waris ............................. 701/201 |
| 2011/0136506 A1 | 6/2011 | Stewart |
| 2011/0137813 A1 | 6/2011 | Stewart |
| 2011/0137814 A1 | 6/2011 | Stewart |
| 2011/0137995 A1 | 6/2011 | Stewart |
| 2011/0137996 A1 | 6/2011 | Stewart |
| 2011/0138006 A1 | 6/2011 | Stewart |
| 2011/0143756 A1 | 6/2011 | Gallagher |
| 2012/0271883 A1 | 10/2012 | Montoya |

OTHER PUBLICATIONS

Stolowitz Ford Cowger LLP; Related Case Listing; Sep. 19, 2012, 2 pages.

* cited by examiner

SOCIAL NETWORKING SYSTEM WHICH PROVIDES LOCATION INFORMATION OF RELATED

CROSS-REFERENCE TO RELATED APPLICATIONS

This application is a continuation of U.S. patent application Ser. No. 12/886,128 titled "Automatic Management of Geographic Information Pertaining to Social Networks, Groups of Users, Or Assets" filed Sep. 20, 2010, whose inventor is Brett B. Stewart, which is a continuation of U.S. patent application Ser. No. 11/641,497, filed on Dec. 19, 2006, entitled "Automatic Management Of Geographic Information Pertaining To Social Networks, Groups Of Users, Or Assets", whose inventor is Brett B. Stewart, now U.S. Pat. No. 7,801,542, which claims the benefit of priority, under 35 U.S.C. §119(e), of U.S. Provisional Application No. 60/752,165, filed Dec. 19, 2005, entitled "Automatic Management Of Geographic Information Pertaining To Social Networks, Groups Of Users, Or Assets," and naming Brett Stewart as the inventor. All of these aforementioned applications are hereby incorporated by reference herein in their entirety as if completely and fully set forth herein.

TECHNICAL FIELD

The present application relates to the management of geographic information related to individual members of groups (social or otherwise) or to assets whose geographic location is being monitored.

BACKGROUND

Individuals, groups, and organizations are increasingly taking advantage of various types of mobile computer and telecommunications technology. Such technology includes, for example, various types of mobile computing devices including cell phones, personal digital assistants (PDAs), notebook computers, tablet computers, and other specialized computing devices. All of these devices have some amount of computing power in support of their specified functions. Moreover, many of these devices include one or more mechanisms for mobile communication, e.g., wireless voice and/or data networks used by cell phones, wireless Ethernet (IEEE 802.11) compliant local area networks (LANs), wireless broadband networks, short range wireless networks such as Bluetooth, and even wired network access such as public and private availability of conventional Ethernet. As users use these mobile devices to perform many of the tasks formerly performed with only stationary devices, there are new opportunities to provide useful information to device users.

SUMMARY

Systems, methods, apparatus and software have been discovered for use by individual users to monitor the geographic location of other people or assets with some relationship to the user. Once some manner of location information is determined, users have the ability to describe that location in various ways and control how that information is shared with other users.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

FIGS. 4A-4B illustrate examples of user interface elements that can be used as part of the systems described in FIGS. 1 and 2.

DETAILED DESCRIPTION

Figure 1:
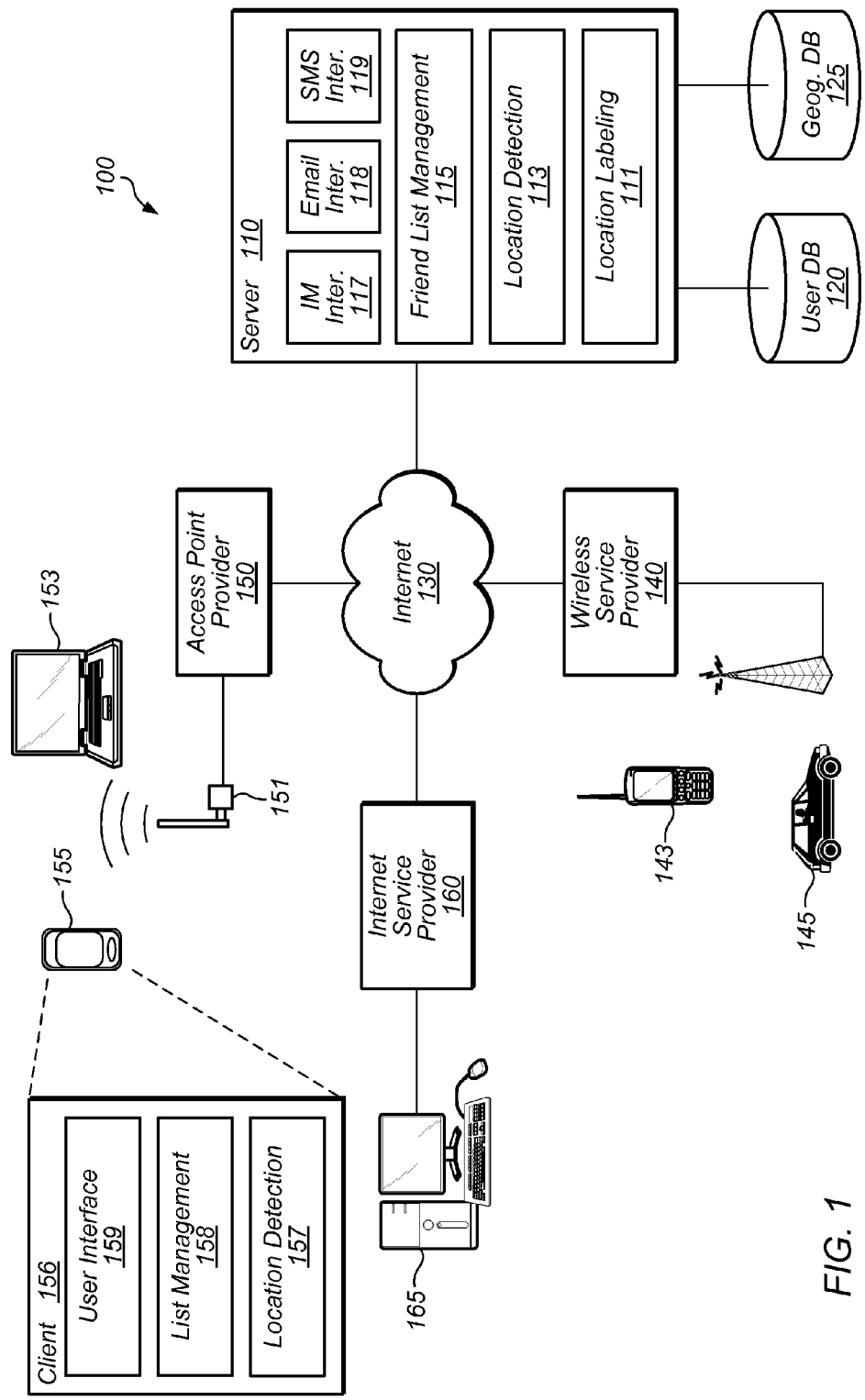
FIG. 1 illustrates a simplified block diagram of a system for providing users with geographic information about other users and/or assets.

The following sets forth a detailed description of at least the best contemplated mode for carrying out the one or more devices and/or processes described herein. The description is intended to be illustrative and should not be taken to be limiting.

Although the description below emphasizes systems, methods, apparatus and software for use by individual users to monitor the geographic location of other people with some relationship to the user (e.g., friends, colleagues, employees, family members, etc.) and to allow others to monitor their geographic location, numerous variations of this basic implementation are contemplated. First, the nature of the relationship among the various users can be one or more of many different relationships. In addition to the already mentioned, numerous other relationships are contemplated including, by way of example, merchant/client relationships, institutional relationships, governmental relationships, and the like. Moreover, various different degrees of geographic information can be included, from the most general (e.g., longitude and latitude coordinates), to the more specific (e.g., room 101, Townes Hall, The University of Texas, Austin, Tex., USA.) Moreover, there can be many different ways to describe the same location, or to characterize a set of locations where less detailed information is desired to be disseminated. Finally, although the examples below will emphasize the location of system users (i.e., people) and the communications devices they possess, the system can be extended to include the management of geographic location information for various different objects.

Various different types of communications devices can be used with or by the systems, methods, apparatus and software described in the present application. Examples include, but are not limited to, mobile computing devices such as cell phones, smart phones, personal digital assistants (PDAs), notebook computers, tablet computers, other specialized computing devices, and computing devices integrated into other devices (e.g., vehicles, vending machines, etc.). Whatever communication device is used, it is assumed to have the requisite computing power and communications access to provide some or all of the functionality described in the present application.

Additionally, these communications devices, the communications networks they use, and/or some other device have to be able to determine and/or provide some manner of geographical information about the device's location and thus its user's location. Here again, there are numerous techniques and mechanisms that can be used to provide this information. In the simplest example, a user explicitly identifies his or her current location to the communications device. In other examples the communications device itself, or in operation with the communications network it utilizes, determines the device's location. In still other examples, some other device or network, separate from the communications device in question determines location information.

Finally, the systems, methods, apparatus and software of the present application allow users to exchange location information in a meaningful way and to define various parameters to control when, to whom, and to what degree location information (and any associated information) is disseminated.

FIG. 1 illustrates a simplified block diagram of a system for providing users with geographic information about other users and/or assets. Note that the components and arrangement shown in FIG. 1 are merely illustrative, and various similar embodiments are contemplated. Computing and communications system 100 can include numerous different client communications devices (143, 145, 153, 155, and 165) using various communications network service providers (140, 150, 160) and one or more servers 110. As will be described in greater detail below, various software and hardware components can be located in the client and server devices as illustrated, located in other devices not illustrated, or differently distributed among client and server devices.

Server 110 includes location detection module 113, location labeling module 111, and friend list management module 115. Additionally, server 110 includes requisite software interfaces for different types of communication such as instant messaging (IM) interface 117, email interface 118, and short message service (SMS) interface 119. These are merely examples of the types of communication protocol interfaces used by server 110 to communicate with various client devices. Moreover, these interfaces can include various sub-components (not shown) such as message servers, protocol stacks, associated databases, and the like.

Location detection module 113 operates independently or in conjunction with one or more of the communication devices and/or one or more of the service providers to determine the location of a particular communications device at any point in time. In some embodiments, individual communications devices determine their location and communicate that information to server 110. In such examples, location detection module 113 need only extract that information from one or more messages received from the communications device. For example, a user of a communications device can explicitly indicate the user's/device's location. Such information in the form, for example, of longitude and latitude information, can be provided to server 110, which extracts the information and associates the information with the user of the device, e.g., storing the information in a user profile in user database 120. The raw location information can take various forms. Server 110 can further use location labeling module 111 to associate the location data with one or more location labels. In some embodiments a user can define, again as part of the user's profile, one or more labels or aliases corresponding to various locations. For example, a user can define a range of longitudes and latitudes as "home", "work", or "school". Location labels can be more specific, and can be overlapping, e.g., "school", "The University of Texas", and "Townes Hall" can include (in whole or in part) portions of the same location. Location labeling can also be automatic in the sense that server 110 attempts to identify one or more location labels that correspond to the location information determined by module 113. Thus, module 111 might utilize geographic database 125 (or other resources not shown) to associate one or more location labels (e.g., "$5^{th}$ & Lavaca St.", "Downtown Austin", "Moe's Tavern") with the specific location identified.

Numerous other techniques can be used to identify the communications device location. In the case of wireless service provider 140 (e.g., a cell phone service provider) and wireless communications devices such as cell phone 143 and in-vehicle communications device 145, various positioning technologies and techniques can be used. In general, positioning technologies calculate, measure, or otherwise determine the physical location of the user and communicate this information to the user, to the service provider, or to some other entity (e.g., server 110). Positioning technologies can use purely device-based approaches, they can utilize information from the communications network, or some combination of the two. Many positioning technologies use some portion of the network, allowing service providers to retain the data (e.g., to ensure its use generates revenue for them). In some instances, network-based positioning technologies allow for the consumption of fewer communication device resources (e.g., power, computing resources, memory, etc.). Moreover, network-centric solutions typically allow the use of communications devices without modification, e.g., it does not matter what specific type of cell phone a user is using.

Examples of network-centric positioning solutions include: cell-ID/cell site sector, enhanced cell-ID, and enhanced observed time difference (E-OTD). Cell-ID/cell site sector positioning technology is perhaps the most widely used cell phone network technique. This technique uses existing data from the network to identify the radio cell site and sector in which a user is located. Consequently, location accuracy is dependent on cell size. While this solution works well in dense urban areas, e.g., enabling positioning down to a city block, it is far less accurate in suburban or rural areas where a cell might cover many square miles. Enhanced cell-ID is another network technology combining cell ID (CI) with one or more other technologies. The level of accuracy is increased over basic CI, often ranging from 75-500 meters. For example, in GSM networks, CI can be combined with timing advance information (which measures handset range from the base station, including whether or not the handset is connected to the nearest cell) and/or received signal level (which measures average signal strength). In W-CDMA networks, CI can be combined with round-trip-time (i.e., a feature of the W-CDMA standard similar to GSM's timing advance) data to improve location accuracy. E-OTD is a network technology that requires additional software on the mobile device and the addition of global positioning system (GPS) or similar positioning system receivers to base stations. Here, the mobile device calculates a user's position by triangulating the differing arrival times of network synchronization data regularly transmitted between handset and base station. A related technique is time difference of arrival (TDOA). TDOA also uses triangulation and time delay, but the processing is performed instead on the network side of the communication link.

Device or "handset" centric solutions include GPS and assisted GPS. Using GPS satellites, handsets can determine their location themselves and to a high degree accuracy where the satellite signal is good. This technique is less effective indoors, and may draw heavily on device power if the position is determined frequently regularly. Similarly, the user may experience noticeable delays if the calculations are performed on-demand. With assisted-GPS (A-GPS) the handset is supplemented with network information to provide additional accuracy and speed of location determination. GPS receivers are connected to the network at various known geographic points to provide additional data to the handset, greatly reducing the time needed to get positioning information and thereby allowing longer battery life. Certain A-GPS variants can also provide better in-building location coverage and accuracy.

Numerous other techniques can be used for determining the position of cellular communications devices, including analysis of radio behavior to position the handset, and to calculate distances, angles of reception and signal strengths. Such techniques can vary depending on the particular cellular technique used. Moreover, various techniques can be combined to provide certain advantages.

Access point provider 150 is, for example a wireless Ethernet (IEEE 802.11) service provider utilizing access point antenna 151 to provide network access to devices such as PDA 155 and laptop 153. Such a wifi hotspot can be provided by businesses (e.g., coffee shops, book stores, etc.), public facilities (e.g., airports, parks, etc.) private facilities or homes, and the like. Devices using access point 150 can include some of the same types of self-locating capabilities previously describe with respect to cellular devices. In other embodiments, however, devices such as communications devices 153 and 155 rely on aspects of the access point provider and/or the related communications network to provide location information.

For example, U.S. Pat. No. 5,835,061, U.S. Pat. No. 6,414,635, and U.S. Patent Publication No. 2002/0173981 describe various techniques for determining, providing, and utilizing geographic location information in conjunction with communications devices using a so-called "wifi hotspot". These documents are incorporated by reference herein in their entirety.

To illustrate the location process very generally, a communication device such as laptop 153 first establishes a connection with access point 150. As will be understood by those skilled in the art, this can involve a variety of steps and utilize various types of hardware and software. Once the connection is established, access point 150 can inform one or more entities of the location of laptop 153 based on the access point's knowledge of its own location. This location information can be configured by the access point provider, automatically determined (e.g., using GPS), or derived in some other manner. As in other examples, the location information can take one or more forms including longitude/latitude coordinates, city information, address information, facility information, and the like. The entities informed will generally be one or both of the relevant client device and a related server such as server 110. In some embodiments, the user of the communications device need not formally avail themselves of the access point services. For example, instead of knowingly accessing the relevant communications network (e.g., Internet 130) via access point 150, the user's device may simply send a beacon signal that is picked up by one or more access points. When the beacon signal is picked up by an access point, information in the beacon signal is compared against a management information base (MIB) (not shown) managed by the access point itself, or some other entity such as server 110. Since the location of the access point is defined and known in the MIB, detection of the presence of the communications device by an access point allows the entity managing the MIB to know where the device and its user are. This information can be used directly, or forwarded to some other device, including the detected communications device itself.

In the example illustrated in FIG. 1, such a MIB can be part of one or both of user database 120 and geographic database 125, or part of another data store not shown. In general, a MIB is a mechanism which allows the persistent storage of information needed by network the access point and/or other portions of system 100 to operate. Examples of such information include a directory of all the elements in the network, the topology of the network, characteristics of individual network elements, characteristics of connection links, performance and trend statistics, and any information which is of interest in system's operation. For example, the MIB can store the precise longitude, latitude, altitude and other geographic information pinpointing the location of one or more access points. Alternatively, an access point can be located by its proximity to another known location. For example, an access point location may be defined as a particular hotel known to be at a particular address or having known latitude and longitude coordinates. The extent of geographic area covered by an access point may be defined in the same ways.

Like determining the location of a cell phone by its presence in a particular cell, mere proximity to a known wife access point may not provide sufficient location information. Thus, various technologies can be used to further identify the location of the user. For example, access point 150 can include circuitry for measuring the signal strength of a signal received from a communications device or for determining the bearing of an incoming signal from a communications device. Software and/or hardware can also be included to set and read time stamps of data packets exchanged between the access point and the communications device. In still other examples, multiple access points, or multiple receivers associated with the same access point can be used to perform triangulation techniques, the resulting location information being compared with the known geography of the vicinity of the access point(s).

Accordingly, there are various techniques for determining the location of a communications device. Basic location information becomes more useful with: (1) the ability to describe that location in various ways (e.g., the use of the aforementioned location labels); and (2) giving users some measure of control over how that information is shared.

The '981 publication teaches a number of techniques whereby businesses may initiate a registration event that would allow the geographic location of the business to be recorded in a computer system along with other attributes, and subsequently used to display selected information about the proximity of businesses to a single user, promotions in effect, etc. The present disclosure can utilize these and other techniques to give a user not simply a list of business locations displayed in a convenient textual or graphical form, but a list of members of a social network (or some other relationship group) displayed in a convenient textual or graphical form. Using information derived by the access point, derived by server 110, supplied by the user, or some combination thereof, the user benefits from the additional convenience of having one or more location labels tailored to the circumstances under which the information is shared. By way of example, a user named Mary could provide specified fellow users (or groups of users) different information such as "Mary is at the Pastime Lounge" or "Mary is at her usual haunt". In the latter example, the information supplied is derived from Mary's specification to a registry (e.g., user database 120) that the Pastime Lounge is "her usual haunt". Moreover, a registration event that aggregates multiple wifi hotspots for registration purpose can further be used to provide different location labels. For example, "the mall" might be an aggregation of multiple businesses. With an aggregation registry, additional conveniences can be provided to the users of communications devices.

Figure 2:
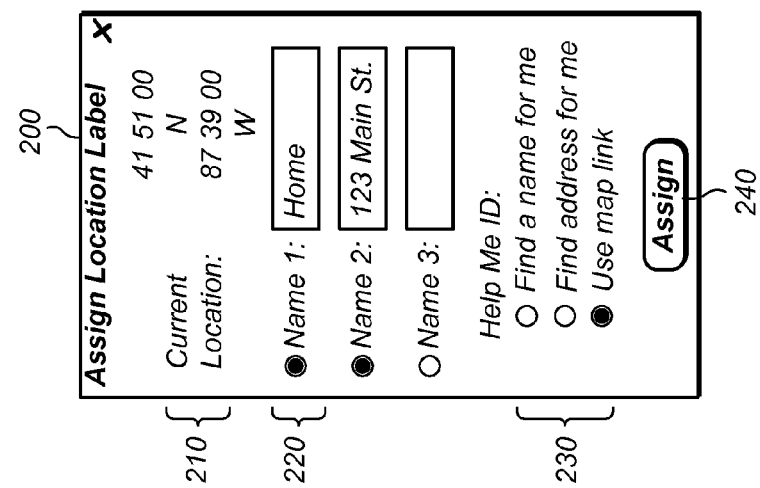
FIG. 2 illustrates an example of user interface elements that can be used as part of the systems described in FIG. 1.

FIG. 2 provides an example user interface for assigning location labels to a particular location. This user interface would typically be presented to a user of a communications device (e.g., part of user interface 159 of client software 156 in PDA 155). In this example, user interface 200 allows a user to assign location labels. At 210, the current location is displayed in some known format, here in longitude and latitude coordinates. This information can be derived by any of the aforementioned techniques and provided to the communications device. Alternately, the user can explicitly enter this information as part of the location label assignment process. Depending on system design, configuration, and user requirements, the default or base location (which is itself a location label) can be in a variety of formats.

User interface elements 220 provide the user multiple options for location labels. The different labels can be categorized in a variety of different ways. Here, they are simply categorized as Name 1, Name 2, etc. In other examples, the category can correspond to a group of users (e.g., family, friends, spouse, colleagues, etc.), a degree of specificity, (e.g., general, city, address), or similar categories. In this example, both Name 1 and Name 2 have been selected by the user as categories for which location labels corresponding to the current location are provided. Corresponding labels "Home" and "123 Main St." are provided by the user. The Name 3 category was not selected and its field is left blank in this example.

Additionally, the user can request the system to provide location label suggestions (230). In this case, a user can pick from one or more classes or types of location label, and have the system (e.g., location labeling module 111 of server 110) determine labels to use. In still other embodiments, some labels can be based on label elections. For example, if 1000 prior users label something "Barton Creek Mall," that label gets "elected" for that location. Similarly, users can suggest a common label. Users may or may not be allowed to change the label. Moreover, users can further alias the elected label, e.g., creating another location label based on the elected label. For example, a user might define "My Usual Haunt" to correspond to the elected label "Barton Creek Mall." Once the user is finished making selections and entering information, he or she actuates assign button 240 to cause the location labels to be assigned. Again, user interface 200 is merely one example illustrating possible mechanisms for assigning location labels. Those skilled in the art will recognize numerous variations in type of user interface (e.g., command line, graphical user) and interface elements. Thus, user interface 200 is implemented using well known user interface elements such as windows, buttons, pull down menus, slide-bars, text fields, icons, pointer icons (e.g., I-beam cursor insertion icons), file selection tools, tree representations, and the like. If the functionality is provided via a browser enabled application, a user may access the tool via a web server client or browser, and user interface 200 is part of a web server that presents an HTML, Flash, etc., user interface. Thus, various different user interfaces or combinations of user interfaces can be used as is well known to those skilled in the art.

Varying levels of location labels allow users to control the type of location information disseminated according to various parameters or location sharing constraints. For example, a user may be willing to tell members of her social network she is "at the mall" but not "at the department store at the mall". Similarly, certain users can receive one level of information (e.g., "tell mom I am at the mall") while others receive another ("tell John I am in the women's section of the department store"). Thus, location labeling functionality will often be determined, at least in part, by the variety of location sharing constraints available in the system.

Returning to FIG. 1, other examples of communications devices include PC 165 coupled to Internet 130 via Internet service provider 160. As shown, PC 165 is connected to network 130 in a wired manner, and is representative of the current trend of users to provide themselves private network connections in their homes or offices. Of course, such connections need not be fully wired, i.e., they can include wireless access similar to wifi hotspots. Thus, the concept of geographic presence communication to members of a social network or other group is extended to these types of devices as well. Whether wired or wireless, these connections are generally unmediated as opposed to the other connections illustrated because they are largely privately established in homes or offices. The present application further contemplates associating the often transitory network address of such network facilities (e.g., broadband access provided by DSL or cable modems) with a location that is meaningful in the context of a social network or other group.

For example, when a user assigns location labels as described above, the particular network address associated with the broadband connection can be location labeled. Such associations can be maintained until such time user communications originate from a different address. To add a degree of convenience to this latter aspect, portable devices can have software that configures the aliases locally as opposed to storing the mapping in a network-based data store. By way of illustration, consider the typical home network, with a network boundary device such as a router, and possibly including a wifi access point. A user connecting his portable device to this network would have automatic availability of information that would uniquely identify the particular point of conventional network attachment. The router would supply a local network address, and identify the gateway to the external network. This gateway would be uniquely determinable by obtaining the media access control (MAC) address of the gateway via the common address resolution protocol (ARP). In a similar fashion, a user of a private wifi hotspot could obtain a unique identifier from the wifi network name or "SSID" separately or in combination with the wifi access point MAC address. Once such a unique proxy for the current location is obtained, the user can be presented with various labeling options. For example, upon identifying a previously unknown connection point to network location, software on the communications device can query the user to associate this location with a particular location label. In this way, the geographic presence of user can be extended to numerous locations.

It should be noted that such techniques offer convenience to stationary users of computing devices attached to networks as well as to mobile users. For example, a stationary home computer with a network connection can have such software installed, so that mobile users can obtain information about the geographic location presence of stationary members of a social network. In still other embodiments, private access points can present location labels without having underling specific location information such as longitude and latitude coordinates. Mobile and stationary users attached to private networks with no geographic information can still use local software to recognize a particular MAC address, wifi SSID, or other network identifiers and associate them with a location label.

Figure 4A:
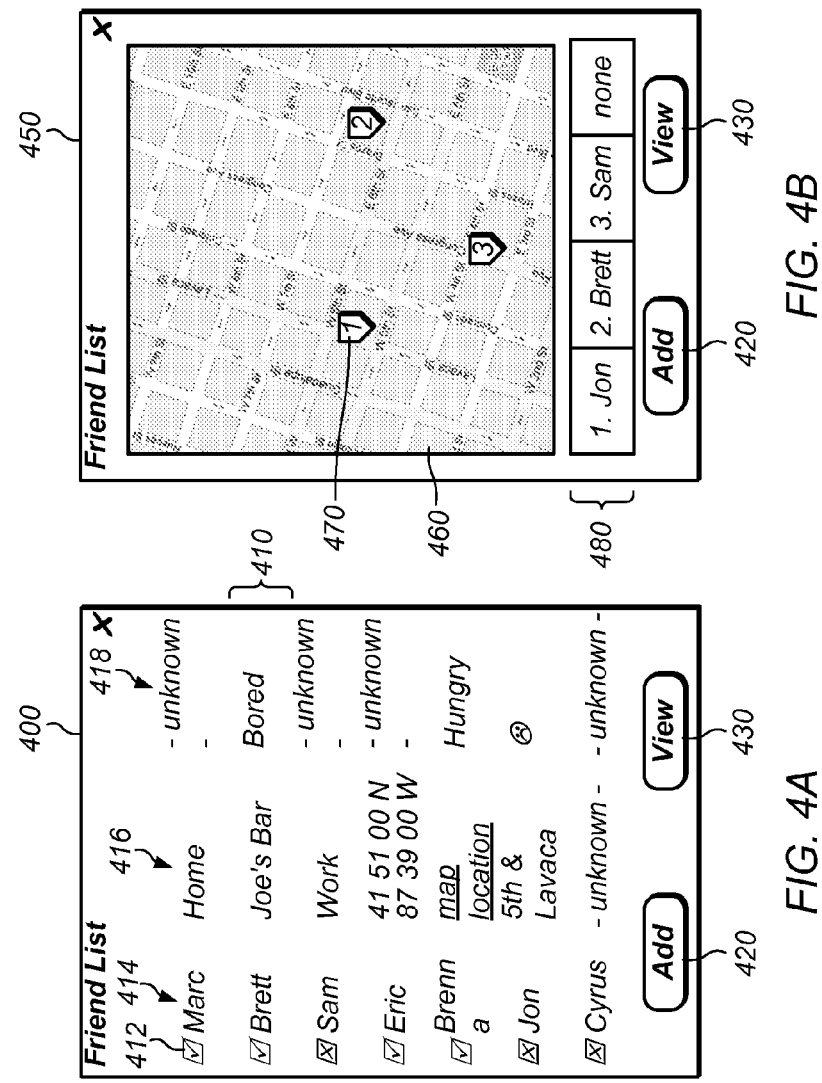
Figure 4A:
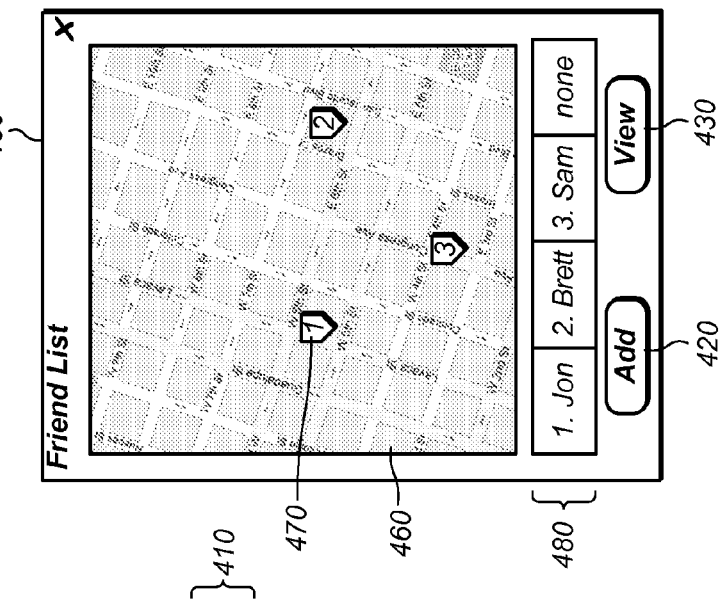

Client software 156 of PDA 155 illustrates an example of some of the software components that can be present in a client device. Various different user interfaces can be implemented in support of the underlying functionality of the client software. Examples of such interfaces are shown in FIGS. 2, 4A, and 4B. Numerous variations of graphical user interfaces, textual user interfaces, voice command user interfaces, and command line user interfaces can be used. Client software 156 will also typically include software in support of location detection (157), particularly where location detection is performed in whole or in part by the client device (e.g., onboard GPS circuitry).

List management 158 provides a user with the tools needed to perform various tasks related to the dissemination of location information including, for example, accepting new users ("friends"), requesting inclusion in the friends list of others, defining location sharing constraints, managing user profile information, processing in-bound location information, and the like. List management 158 can be an integrated part of other tools, such as IM or SMS client software, or a standalone tool for users to manage their friends list. Some or all of list management 158 can be local to client software 156, or list management 158 might simply be an interface to server-side functionality, e.g., list management functionality is accessed from a web server via a browser that is part of client software 156. Client software 156 can include other types of functionality, either as part of the modules illustrated, or as part of separate modules. For example, to provide user identification and/or security functions, client 155 can include a certificate or other identification information for transmitting to the appropriate access point. This identification information can be further relayed to different service providers or server 110. The digital certificate or profile can store information needed for user authentication and security on the network.

However implemented, list management 158 provides the user with a suite of features to manage their geographic friends list. Users can receive requests for inclusion from other users and decide whether or not to include the other users in their list. A user can define parameters for managing the automatic inclusion or exclusion of new friends. Similarly, a user can request to be included in the list of another user. In still other examples, other social network software can mediate the request, providing further functionality, such as identifying friends-of-friends, indicating the nature of the desired relationship, only making the request if certain conditions are met by the receiving user, and the like.

A user can enable or disable the dissemination of their location information. Such enabling/disabling can be globally, per person, per groups of people, location dependent, time dependent, mood dependent, and the like. In general, numerous different qualifiers can be used as location information constraints. Similarly, a user can select when or where they wish to receive location information from other users. Such information can also be constrained on a per friend basis, based on groups, etc. A user can also define the type of location information, e.g., which location label(s) can be sent to which users. This can range from no information, to general information ("home", "work", "out", "school", etc.), to more specific information such as longitude and latitude coordinates, addresses, map links, and user defined aliases. In still other examples, a user can explicitly inform other users that they are not informing other users of their present location.

Users can also define the manner in which they want the client to respond when friends' location information is received. For example, users can request to be notified of changes (e.g., visually, via an audible indicator, or via a tactile feature such as vibration). Such indicators may depend on proximity. For example, a user can be notified of another user's location when the other user is within a certain distance from the first user, or when the other user is beyond a certain distance. As above, all of these constraints can be applied on various different user levels, e.g., per user, per user groups, etc.

As noted above, use of list management 158 can be related to one or more social networks maintained via software. Moreover, some or all of the constraints described can be based on information from such social networks. For example, each of the users can be a member of or associated with a system that tracks the various relationships between and among the users, who form a community. Examples include MySpace.com, Friendster.com, Orkut.com, Dodgeball.com, Facebook.com, and the like. With system membership, users typically provide information to complete a profile about the user. Such profiles can contain all relevant information about user, such as name, gender, other identification information, pictures, preferences of the user, smoking/non-smoking status, religion, educational background, hobbies, and other features that are commonly associated with profiles for relationship or dating systems. Certain location preferences can also be specified, e.g., favorite restaurants, bars, clubs, bookstores, coffee shops, etc. Such profile information can be stored locally, but is more likely stored by some system server, e.g., server 110.

Client software 156 is merely an example, and the specific features included can vary based on a number of factors including, for example, design choices, features that are enabled (e.g., based on payment to a service provider), the type of communications device used, the type of access point, and the like. The software components of server 110 will also vary depending on these and other factors. As noted above, various different types of information are stored in databases 120 and 125. These databases provide a uniform, secure, and resilient data store for various different types of information used in system 100. Databases 120 and 125 are typically implemented using a database management system (DBMS). Examples of such DBMSs include IBM's DB2, Oracle Corporation's database management systems, Microsoft SQL Server, Sybase IQ, MySQL, PosgreSQL, and the like. These databases can be a relational or non-relational database. Although schematically illustrated as a separate program/entity, some implementations of database 120 and 125 can be integrated with other applications, such as software shown in server 110. In such embodiments, one or more databases might not be considered to be a "traditional" database, but rather some other type of data store. Nevertheless, as used in the present application, "database" should be given its broadest meaning.

Finally, although only certain types of network connectivity are illustrated in FIG. 1, numerous different types of wireless and wired connectivity are envisioned. Emerging wireless technologies such as 3G, WiMAX (IEEE 802.16), UWB, wireless USB, various types of broadband service, and even older data communication schemes such as dial-up through the PSTN can be used in conjunction with the system of FIG. 1.

Figure 3:
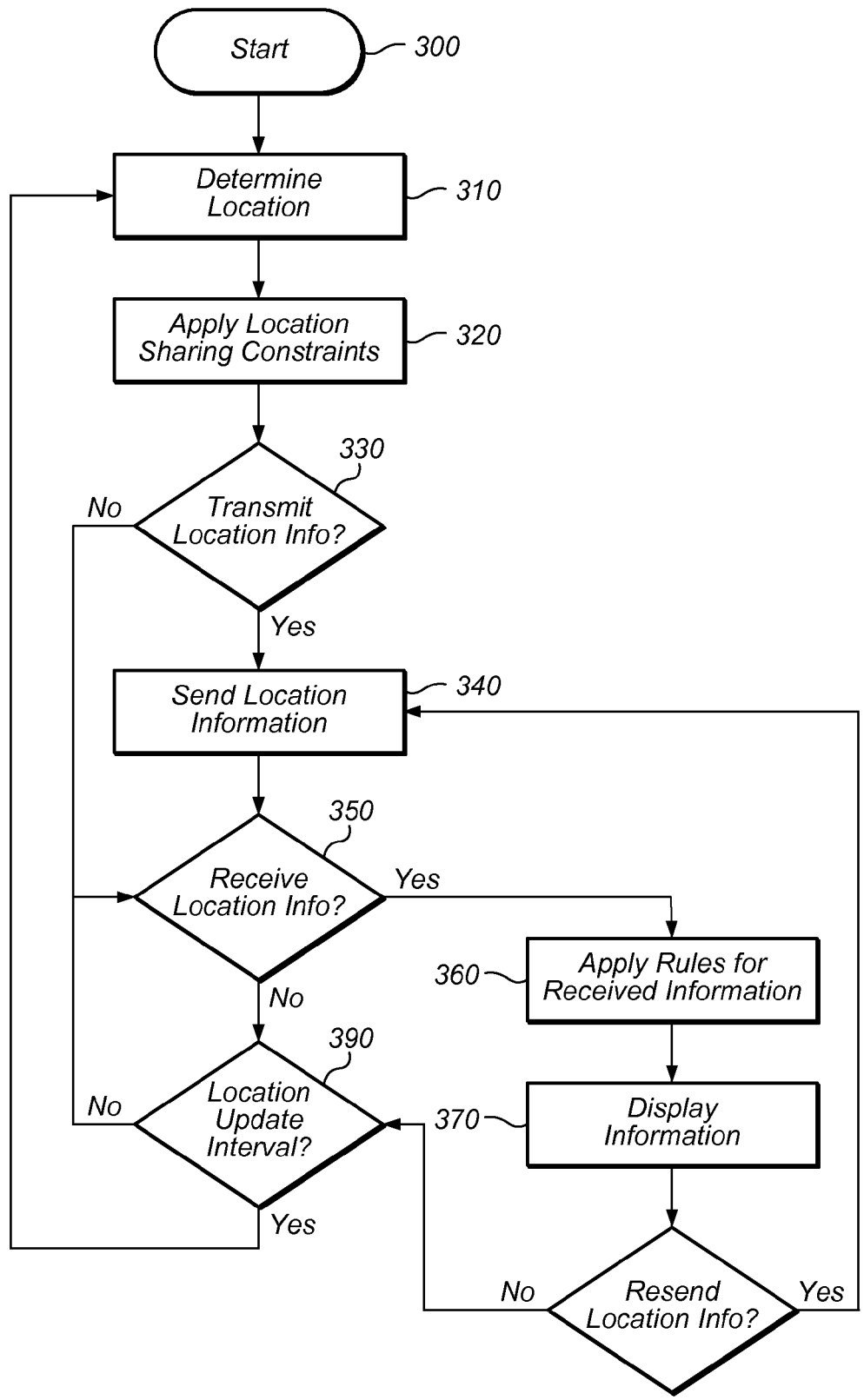
FIG. 3 is a flow chart illustrating aspects of operation of a system for providing users with geographic information about other users and/or assets.

FIG. 3 is a flow chart illustrating some aspects of the operation of a system such as system 100. Note that various operations illustrated can alternately be performed by client communication devices, a server, or some combination of the two. Operation begins at 300, where it is assumed that both client and server devices are properly configured, and a user can access the friend list system. This may further require various initialization, configuration, and log-in operations not shown.

In operation 310, the location of a client device is determined. As noted above, this can be performed in a variety of different ways including: user identification of location, location determination by the client device, location determination by the network, location determination by a server device, or some combination thereof. Once a location is determined, associated location labels can be accessed. These may be two distinct operations, or a combined operation. Location label determination may require access to a user profile or database with location label information. Consequently, location information may be transmitted from client to server or vice versa in order to perform requisite look-up operations to determine established location labels for a particular location. In still other embodiments, determination of location labels can be performed as part of operation 320.

Once a location (and possibly related location labels) is determined, user specified location sharing constraints are analyzed to determine one or more of when, how, and to whom location information is sent (320). Since the location label used can vary based on these constraints, location label determination can be performed in whole or in part as part of this process. Moreover, this operation can be performed by the client, by the server, or some combination of the two. Based on the application of one or more location sharing constraints, a determination is made (330) whether to transmit location information to one or more users or groups of users. If location information is not to be transmitted to fellow users, operation transitions to 350 described below. If location information is to be transmitted, the transmission occurs at 340. In addition to location information, other related information can be included. For example, user profile information, simple messages, and user status information (e.g., available to chat, mood information, availability for social interaction, etc.) can accompany the location information. This information can be transmitted from one client directly to another, from client to server to client, from server to client (e.g., in the cases where application of location sharing constraints is performed by the server), or some combination thereof.

Once transmission is complete, a client communications device operates in a receive mode where it awaits in-bound location information from other users. If such information is received, as determined in 350, operation transitions to 360 where any rules for handling receipt of location information are applied against the information. This will typically cause some manner of information "display", e.g., graphically, textually, via indicator lights, audibly, or via some mechanical operation such as vibration.

FIGS. 4A-4B illustrate examples of user interface elements that can be used to display received location information. FIG. 4A illustrates a sample Friends List display 400. Display 400 includes entries (410) for each friend, or, in some embodiments, for only those friends for which there is some location information. Entries include: availability indicator 412 indicating a friend's availability for IM, SMS, or other types of direct communication; friend name 414 (e.g., a full name, first name, or nickname); friend location information 416 (e.g., simple labels like "Home", place names, longitude and latitude coordinates, addresses, or links to a location on a graphically displayed map); and qualifier information 418 providing some further information about the user in either graphical or textual form. These entries are merely examples, and numerous different types of information can be included. Moreover, multiple entries of the same type (e.g., multiple location labels) can also be displayed. Various entries can also be hyperlinks or buttons leading to other software functionality. For example, actuating the "map location" link can cause the display of a map showing Brenna's location. Similarly, actuating "Marc" can initiate an IM session with Marc. Still other functionality can be built into user interface elements. Display 400 typically includes one or more graphical user interface elements such as buttons 420 and 430 for accessing other software functions such as adding users or changing the type of display. In still other examples, the display is a simple text message, email, IM, ticker display, voicemail, or the like.

FIG. 4B illustrates an alternate view 450 of the friends list. Here, a map image 460 is provided with indicators 470 showing locations of various friends. Legend 480 provides additional information in order to minimize the size and or complexity of indicators 470. Although different symbols are used in this example, various other icons, colors, shapes, and the like can be used to identify different friends.

Returning to FIG. 3, once received information is displayed, a determination is made whether location information should be resent (380). For example, if the user receives location information from Marc, the user may decide (or a decision can be made based on previously defined rules or parameters) to transmit new location information to Marc. If it is desirable to transmit location information, whether new location information to an existing user, existing location information to a new user, etc., any updates are prepared and operation returns to 340. If there is no need to transmit or re-transmit location information, or if there was no received location information, operation proceeds to 390. Here, a determination is made whether some defined interval has expired at it is desired to update current location information. The interval might be a time interval, e.g., update current location every 5 minutes, or it might be an update forced by the user. For whatever reason, if the current location of the user should be updated, operation returns to 310. If not, the process returns to 350 and operates in an event driven loop.

The flow chart of FIG. 3 illustrates some of the many operational examples of geographic user list management disclosed in the present application. Those having ordinary skill in the art will readily recognize that certain steps or operations illustrated in FIG. 3 can be eliminated or taken in an alternate order. Moreover, the methods described throughout this application (including FIG. 3) are typically implemented (in whole or in part) as one or more software programs encoded in a computer readable medium as instructions executable on a processor. The computer readable medium can be any one of an electronic storage medium, a magnetic storage medium, an optical storage medium, and a communications medium conveying signals encoding the instructions. Separate instances of these programs can be executed on separate devices in keeping with the methods described above. Thus, although certain steps have been described as being performed by certain devices, software programs, processes, or entities, this need not be the case and a variety of alternative implementations will be understood by those having ordinary skill in the art.

Figure 5:
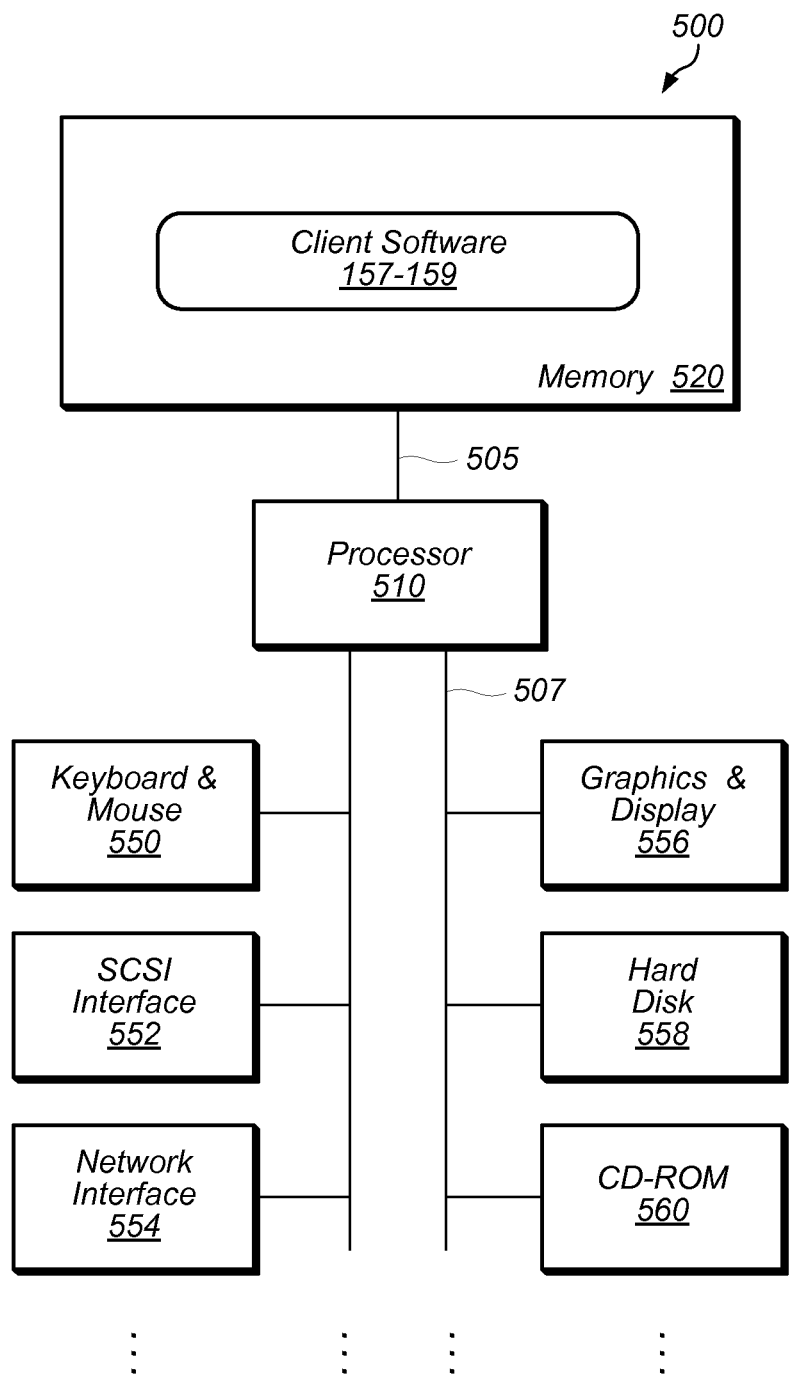
FIG. 5 is a simplified block diagram of a computer system for implementing the techniques disclosed in the present application.

FIG. 5 illustrates a block diagram of a computer system 500 for implementing the techniques of the present invention. For example, computer system 500 can be an embodiment of one of the previously described servers or client computer systems. Computer system 500 includes a processor 510 and a memory 520 coupled together by communications bus 505. Processor 510 can be a single processor or a number of individual processors working together. Memory 520 is typically random access memory (RAM), or some other dynamic storage device, and is capable of storing instructions to be executed by the processor, e.g., software 157-159. Memory 520 is also used for storing temporary variables or other intermediate information during the execution of instructions by the processor 510.

Those having ordinary skill in the art will readily recognize that the techniques and methods discussed below can be implemented in software using a variety of computer languages, including, for example, computer languages such as C, C++, C#, Java, JavaScript, VBScript, JScript, PHP, Perl, SQL; development environments/tools such as Active Server Pages (ASP), JavaServer Pages (JSP), and ColdFusion; and interface tools such as the Common Gateway Interface (CGI). Additionally, software 157-159 can be provided to the computer system via a variety of computer readable media including electronic media (e.g., flash memory), magnetic storage media (e.g., hard disk 558, a floppy disk, etc.), optical storage media (e.g., CD-ROM 560), and communications media conveying signals encoding the instructions (e.g., via a network coupled to network interface 554).

Computer system 500 also includes devices such as keyboard & mouse 550, SCSI interface 552, network interface (wireless and/or wired) 554, graphics & display 556, hard disk 558, and CD-ROM 560, all of which are coupled to processor 510 by communications bus 507. It will be apparent to those having ordinary skill in the art that computer system 500 can also include numerous elements not shown in the figure, such as additional storage devices, communications devices, input devices, and output devices, as illustrated by the ellipsis shown.

Although the present invention has been described with respect to specific embodiments thereof, various changes and modifications may be suggested to one skilled in the art and it is intended that the present invention encompass such changes and modifications as fall within the scope of the appended claims.

What is claimed is:

1. A method, comprising:
    determining, by a processing device, a current location associated with a first mobile communication device;
    receiving, by the processing device, a user selection of one or more types of location label selected from a plurality of location label types;
    displaying, by the processing device, a plurality of suggested labels for user selection, wherein the suggested labels identify the determined current location associated with the first mobile communication device, and wherein the processing device displays the plurality of suggested labels to the user in response to the user selection of the one or more types of location label;
    identifying, by the processing device, a second mobile communication device;
    receiving, by the processing device, a user selection of a label selected from the plurality of suggested labels, wherein receiving the user selection of a label selected from the plurality of suggested labels comprises receiving a user request to assign the selected label to the determined current location associated with the first mobile communication device; and
    transmitting, by the processing device, the selected label to the second mobile communication device in response to identifying the second mobile communication device and receiving the user selection of the selected label.

2. The method of claim 1, wherein the selected label comprises a user-supplied label.

3. The method of claim 1, wherein the selected label comprises a default label assigned by a service provider.

4. The method of claim 1, wherein the selected label is transmitted while the first mobile communication device is located at the determined current location.

5. The method of claim 1, wherein the selected label is selected by a user associated with a user network, wherein the method further comprises storing, by the processing device, the plurality of suggested labels that are associated with the determined current location, and wherein the plurality of suggested labels were supplied by other users within the same user network.

6. The method of claim 1, wherein the selected label is selected by a user associated with a user network, and wherein the plurality of suggested labels comprise labels supplied by users within the same user network.

7. The method of claim 6, wherein the selected label comprises a label included in a user profile corresponding to the user.

8. The method of claim 1, further comprising:
    receiving, by the processing device, a second user selection of a second label from the plurality of suggested labels, wherein the second label is different than the selected label;
    identifying, by the processing device, a third mobile communication device; and
    transmitting, by the processing device, the selected second label to the third mobile communication device in response to identifying the third mobile communication device.

9. A memory device having instructions stored thereon that, in response to execution by a processing device, cause the processing device to perform operations comprising:
    determining a current location associated with a first mobile communication device;
    receiving a user selection of one or more types of location label selected from a plurality of location label types;
    prompting display of a plurality of suggested labels for user selection, wherein the suggested labels identify the determined current location associated with the first mobile communication device, and wherein the plurality of suggested labels are displayed in response to the user selection of the one or more types of location label;
    identifying a second mobile communication device;
    receiving a user selection of a label from the plurality of suggested labels, wherein receiving the user selection of a label selected from the plurality of suggested labels comprises receiving a user request to assign the selected label to the determined current location associated with the first mobile communication device; and
    transmitting the selected label to the second mobile communication device in response to identifying the second mobile communication device and receiving the user selection of the selected label.

10. The memory device of claim 9, wherein the selected label comprises a user-supplied label.

11. The memory device of claim 9, wherein the selected label is transmitted while the first mobile communication device is located at the determined current location.

12. The memory device of claim 9, wherein the plurality of suggested labels comprise a group of label types including address-type labels and user-defined-type labels.

13. An apparatus, comprising:
  location detection circuitry configured to determine a current location associated with a first mobile communication device;
  a processing device configured to identify a second mobile communication device and to receive a user selection of one or more types of location label selected from a plurality of location label types, wherein the processing device is further configured to provide a plurality of suggested labels in response to the user selection of the one or more types of location label;
  a user interface configured to receive a user selection of a label from the plurality of suggested labels displayed on the first mobile communication device, wherein the suggested labels comprise descriptions of the determined current location associated with the first mobile communication device, and wherein the user selection of a label selected from the plurality of suggested labels is received as a user request to assign the selected label to the determined current location associated with the first mobile communication device; and
  a communication device configured to transmit the selected label to the second mobile communication device in response to identifying the second mobile communication device and receiving the user selection of the selected label.

14. The apparatus of claim 13, wherein the selected label comprises a user-supplied label.

15. The apparatus of claim 13, wherein the selected label is transmitted while the first mobile communication device is located at the determined current location.

16. The apparatus of claim 15, wherein the selected label comprises a customized description of the determined current location.

17. The apparatus of claim 13, wherein the location detection circuitry is further configured to determine the current location at a certain point in time corresponding to when the user selection of the label is received.

* * * * *